Patented Apr. 15, 1930

1,754,453

UNITED STATES PATENT OFFICE

CLARENCE W. BALKE, OF HIGHLAND PARK, ILLINOIS, ASSIGNOR TO FANSTEEL PRODUCTS COMPANY, INC., OF NORTH CHICAGO, ILLINOIS, A CORPORATION OF NEW YORK

METHOD OF REMOVING CARBON IMPURITIES FROM TANTALUM

No Drawing. Application filed September 2, 1926, Serial No. 133,305. Renewed February 28, 1929.

My invention relates to methods of producing substantially pure metallic tantalum.

In the process of making solid metallic tantalum bars it is necessary at a certain stage to eliminate the carbon impurities which are present with the tantalum. The greater portion of the carbon impurities are in the form of graphite although appreciable quantities may at times be combined with the tantalum in the form of tantalum carbide. It is the object of my invention to provide an improved method for removing these carbon impurities. Other objects will appear from the following detailed description.

In the reduction of potassium fluotantalate ($K_2TaF_7$) and tantalic oxide ($Ta_2O_5$) according to the process disclosed in my co-pending application, Serial No. 658,289, filed August 20, 1923, a product of the electrolysis is a mass consisting largely of the double fluoride of tantalum, some crystals of metallic tantalum, and carbon impurities.

According to my present invention, after this mass has cooled it is ground into a fine powder so as to free the metallic tantalum crystals which are agglomerated in the product of the electrolysis. Through the employment of some mechanical process, such as air separation, a Wilfley table, or decantation, the greater portion of the impurities may be separated from the metallic tantalum. However, by the present methods it is impossible to remove all of the carbon from the tantalum by mechanical means.

I have discovered that the following relatively simple process is very effective in removing the remaining carbon (usually in the form of graphite) from the tantalum. A small sample of the batch, obtained after the greater portion of the impurities have been mechanically removed, is analyzed to determine its carbon content, and from the data thus obtained, the proper proportion of magnesium oxide (MgO) is added to the batch of impure tantalum and thoroughly mixed therewith by running it in a small porcelain ball mill for about ten minutes. The amount of the magnesium oxide (MgO) added is computed on the assumption that it will react with the carbon to form carbon monoxide (CO) and free magnesium.

This mixture of the magnesium oxide with the batch of tantalum with the carbon impurities is pressed into bars, and the bars placed in a sintering furnace. The air is exhausted from the furnace and heat applied. As the temperature is raised a point is reached at which the reaction between the magnesium oxide and the carbon will take place, producing carbon monoxide (CO) and magnesium. This reaction begins at about 1,800 to 2,000° centigrade. The exact temperature cannot be ascertained. Heat is continued until the temperature approaches the melting point of tantalum. At the beginning of the reaction there will be a fall in the vacuum due to the carbon monoxide which is given off. The heating is continued until the vacuum is reestablished and the pumping process is continued until all the gases are expelled from the metal. The carbon monoxide will be pumped from the furnace, and the magesium will volatilize and deposit as a fine metallic powder upon the cooler parts of the furnace.

The above described process results in a bar which is free from all impurities and which is in condition to be used. By maintaining the furnace at the proper temperature practically all of the magnesium will be deposited upon the furnace walls and only minute quantities will be carried into the vacuum pumps.

It will be apparent that slight variations may be made in the above described process without departure from the principles of my invention. I, therefore, wish to limit the scope of my invention only by the claims which follow.

I claim:

1. The process of removing the carbon impurities from tantalum which consists in mixing a predetermined amount of magnesium oxide with the tantalum and carbon, and heating the mixture in a vacuum to a temperature at which the carbon will be oxidized and the residual magnesium volatilized.

2. The process of obtaining tantalum from a mixture of tantalum and graphite which consists in mixing a predetermined weight of magnesium oxide with said mixture, and raising the temperature of the resultant mixture in a continuously maintained vacuum until the magnesium oxide has reacted with the graphite to form carbon monoxide, and the resulting magnesium volatilized.

3. The process of separating graphite impurities from tantalum which consists in mixing a predetermined quantity of magnesium oxide with the graphite and tantalum, pressing the mixture into bars and heating the bars in a continuously maintained vacuum to a temperature below the melting point of tantalum.

4. The process of separating carbon impurities from tantalum which consists in mixing a predetermined weight of magnesium oxide with the impure tantalum and heating the mixture in a continuously maintained vacuum to a temperature at which the reaction is complete.

5. The process of separating carbon impurities from refractory rare metals which consists in mixing with metallic powder the oxide of a substance vaporizable below the melting point of said refractory rare metal, and heating the mixture in a continuously maintained vacuum to a temperature below the melting point of the refractory rare metal and above the volatilizing temperature of said substance, whereby the oxygen removes carbon impurities from the refractory rare metal and said substance is removed by volatilization.

In witness whereof, I hereunto subscribe my name this 28th day of August, 1926.

CLARENCE W. BALKE.